(No Model.)
W. H. SARGENT.
FILTERING FAUCET.
No. 383,493. Patented May 29, 1888.
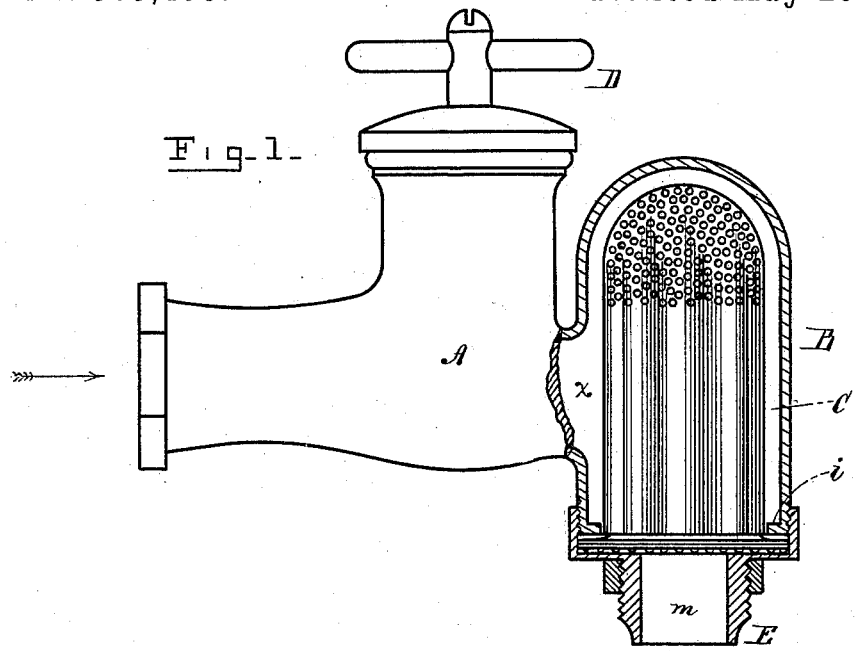
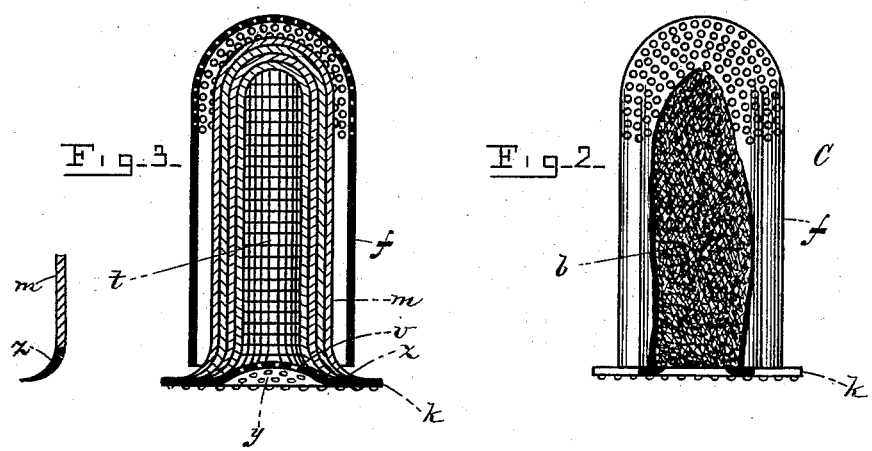
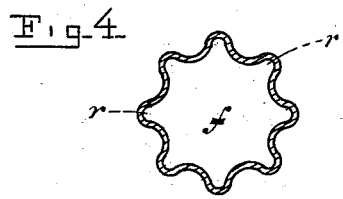
WITNESSES:
E. M. Finney
Thomas A. Tallon
INVENTOR:
William Henry Sargent
PER C. A. Shaw & Co.
ATTYS.

UNITED STATES PATENT OFFICE.

WILLIAM H. SARGENT, OF WEYMOUTH, MASSACHUSETTS.

FILTERING-FAUCET.

SPECIFICATION forming part of Letters Patent No. 383,493, dated May 29, 1888.

Application filed January 6, 1888. Serial No. 259,937. (No model.)

*To all whom it may concern:*

Be it known that I, WILLIAM HENRY SARGENT, of Weymouth, in the county of Norfolk, State of Massachusetts, have invented a certain new and useful Improvement in Filtering-Faucets, of which the following is a description sufficiently full, clear, and exact to enable any person skilled in the art or science to which said invention appertains to make and use the same, reference being had to the accompanying drawings, forming part of this specification, in which—

Figure 1 is a side elevation of my improved faucet, a portion being represented as broken away to show the filter; Fig. 2, a side elevation of the filter proper removed, a portion of the case, felt, and wire screen being represented as broken away to show the filling; Fig. 3, a vertical longitudinal section of the filter proper with the filling removed, and Fig. 4 a horizontal section of the corrugated case.

Like letters and figures of reference indicate corresponding parts in the different figures of the drawings.

My invention relates to that class of faucets which are provided with filters for filtering the water and other fluids passing through them, and the object is to produce a simpler, cheaper, and more effective device of this character than is now in ordinary use.

The nature and operation of the improvement will be readily understood by all conversant with such matters from the following explanation.

In the drawings, A represents the body of the faucet, and B the filter-chamber, these parts being preferably formed integral or cast in one piece. The faucet is provided with an ordinary valve, D, and a screw-cap, E, having a duct, $m$. The filter proper, C, considered as a whole, consists of a thimble-shaped metallic case, $f$, which is provided with a corrugated body and perforated top.

Within the case $f$ is placed one or more thimble-shaped felt screens, $m$, and within the felt screens a thimble-shaped wire-cloth or foraminous screen, $t$. The felt screens $m$ each have an outwardly-projecting annular flange, $z$, at the bottom, which is made by saturating or covering the lower portion of the screen with shellac varnish, cement, or other similar water-proof material and pressing it into the form of a flange; but the flange may be shaped or formed and afterward saturated or coated with varnish, or cement, if preferred, and instead of the varnished flange the screen may be provided with a metallic hoop or flange at the bottom. The wire-cloth screen $t$ also has an outwardly-turned annular flange, $v$, at the bottom, adapted to keep the lower portion of the felt screen distended.

A circular foraminous bottom or retaining-plate, $k$, is placed beneath the felt and wire-cloth screens, said plate being provided centrally with an upwardly-curved projection, $y$, which serves to "center" the superposed screens and keep the lower portions of the same distended, or in proper position.

In the use of my improvement the chamber formed by the inner or wire-cloth screen, $t$, is filled with powdered charcoal, quartz, gravel, or any other suitable filtering material, $b$, and the plate $k$ placed over the same to hold it in position, after which the filter proper is inserted in the chamber B and secured by the screw-cap or nozzle E.

The chamber B is provided with an inwardly-projecting annular flange, $i$, at its bottom, against which the plate $k$ rests when the cap E is screwed on.

The perforated portion of the corrugated case $f$ stands above the plane of the duct $x$, through which the water enters the chamber B, and hence as the water enters it strikes said case and the larger portion of its impurities are precipitated thereby to the bottom of the chamber around said case, where they will remain until removed by taking off the cap E.

By corrugating the case $f$ it is not only strengthened, but a series of vertically-arranged ducts, $r$, are formed, which lead down between the case and outer felt screen, $m$, thus preventing said case from interferring with the proper action of said screen.

The number of felt screens $m$ to be employed is governed by the pressure of the water and quantity of impurities it contains. In the instance shown four felt screens are used, but more than two are seldom required.

When more than one felt screen is employed, I construct the outer one of coarse materials and the inner one of finer materials, the innermost being the finest or most compact in texture, for obvious reasons.

I do not confine myself to using more than one felt screen or to constructing either of the screens with annular flanges at the bottom, or to waterproofing the flanges on the felt screens. Neither do I confine myself to using the filtering material $b$ within the screen $t$, as this may be omitted, if desired.

Having thus explained my invention, what I claim is—

1. A filter comprising the metallic case $f$, having a corrugated body and a perforated crown-top, a thimble-shaped felt screen disposed within said case and provided with an outwardly-projecting flange at its lower end, a thimble-shaped wire-cloth screen disposed within said felt screen, and also provided with an outward flange at its lower end, and a perforated plate disposed beneath said case and screen, substantially as described.

2. In a faucet of the character described, the metallic case $f$, having its body corrugated and its upper portion perforated, in combination with a felt screen disposed within said case, a wire-cloth screen disposed within said felt screen, a perforated plate disposed beneath said case and screen, the body A, valve D, chamber B, and cap E, having the duct $m$, all combined and arranged to operate substantially as specified.

3. The improved faucet herein described, the same consisting of the body A, provided with the valve D, the chamber B, connected with said body and provided with the flange $i$, and screw-cap E, having the duct $m$, the metallic case $f$, having its body corrugated and its upper portion perforated, the thimble-shaped felt screens $m$, provided with the waterproofed flanges $z$, the thimble-shaped wire-cloth screen $t$, provided with the flange $v$, the filtering material $b$, disposed within the screen $t$, and the perforated plate $k$, having the upwardly-curved projection $y$, all being constructed, combined, and arranged to operate substantially as set forth.

WILLIAM H. SARGENT.

Witnesses:
O. M. SHAW,
E. M. SPINNEY.